(12) United States Patent
Roesler et al.

(10) Patent No.: US 7,956,098 B2
(45) Date of Patent: Jun. 7, 2011

(54) COATING COMPOSITIONS CONTAINING ETHYLENICALLY UNSATURATED POLYURETHANES AS BINDERS

(75) Inventors: Richard R. Roesler, Wexford, PA (US); Charles A. Gambino, McDonald, PA (US); Catherine M. Britsch, Pittsburgh, PA (US)

(73) Assignee: Bayer MaterialScience LLC, Pittsburgh, PA (US)

(*) Notice: Subject to any disclaimer, the term of this patent is extended or adjusted under 35 U.S.C. 154(b) by 623 days.

(21) Appl. No.: 11/104,174

(22) Filed: Apr. 12, 2005

(65) Prior Publication Data

US 2006/0229426 A1    Oct. 12, 2006

(51) Int. Cl.
*C08G 18/67* (2006.01)

(52) U.S. Cl. ............... 522/90; 522/174; 528/52; 528/84

(58) Field of Classification Search ................ 522/90, 522/174; 528/52, 84
See application file for complete search history.

(56) References Cited

U.S. PATENT DOCUMENTS

| | | | | |
|---|---|---|---|---|
| 3,719,638 A * | 3/1973 | Huemmer et al. | ............. | 525/293 |
| 4,188,472 A | 2/1980 | Chang | .............................. | 528/75 |
| 4,340,497 A | 7/1982 | Knopf | .................... | 252/188.3 R |
| 4,608,409 A * | 8/1986 | Coady et al. | .................... | 524/199 |
| 5,322,861 A * | 6/1994 | Tsuge et al. | ..................... | 522/90 |
| 5,356,951 A * | 10/1994 | Yearn et al. | .................... | 523/116 |
| 5,380,772 A * | 1/1995 | Hasegawa et al. | ............. | 522/14 |
| 5,703,141 A * | 12/1997 | Jin | .................................... | 522/97 |
| 5,731,388 A * | 3/1998 | Suzuki et al. | ................. | 525/404 |
| 5,777,024 A | 7/1998 | Killilea et al. | ................. | 524/590 |
| 6,306,504 B1 | 10/2001 | Meixner et al. | ................. | 428/412 |
| 6,316,119 B1 | 11/2001 | Metzger et al. | ................. | 428/520 |
| 6,465,539 B1 | 10/2002 | Weikard et al. | .................. | 522/90 |
| 6,534,128 B1 | 3/2003 | Carlson et al. | ................. | 427/466 |
| 6,538,044 B2 | 3/2003 | Ledniczky et al. | ............. | 522/46 |
| 2003/0059555 A1 | 3/2003 | Fenn et al. | ..................... | 427/558 |
| 2005/0238815 A1 * | 10/2005 | Dvorchak et al. | ............ | 427/487 |

FOREIGN PATENT DOCUMENTS

| | | |
|---|---|---|
| JP | 2003-342525 | 12/2003 |
| JP | 2004-059820 | 2/2004 |
| JP | 2004-338214 | 12/2004 |
| WO | 97/04881 | 2/1997 |
| WO | 03/027162 A1 | 4/2003 |

* cited by examiner

*Primary Examiner* — Milton I Cano
*Assistant Examiner* — Michael Leonard
(74) *Attorney, Agent, or Firm* — Robert S. Klemz; Noland J. Cheung

(57) ABSTRACT

The present invention relates to a binder-containing coating composition, which may be cured by free radical polymerization, wherein the binder resins contain
A) the reaction product of i) one or more polyisocyanates with ii) a hydroxyl component containing ii-a) one or more hydroxyl compounds containing two ethylenically unsaturated groups,
B) the reaction product of i) one or more polyisocyanates with ii) a hydroxyl component containing ii-a) one or more hydroxy functional lactone ester (meth)acrylates having a number average molecular weight of about 200 to 2,000, and
C) the reaction product of i) one or more polyisocyanates with ii) a hydroxyl component containing ii-a) one or more hydroxy functional (meth)acrylates.

10 Claims, 6 Drawing Sheets

Initial Hardness 14 day Hardness

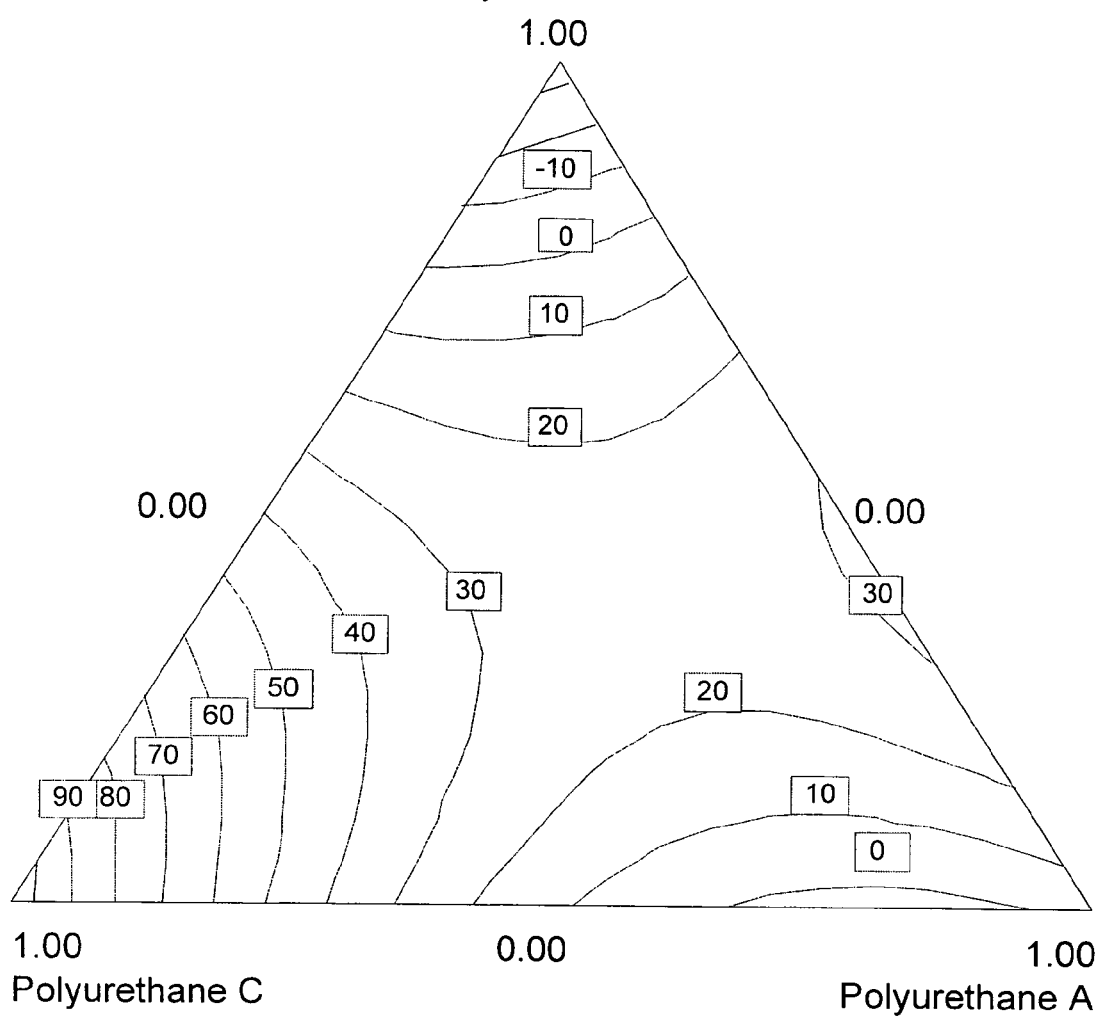

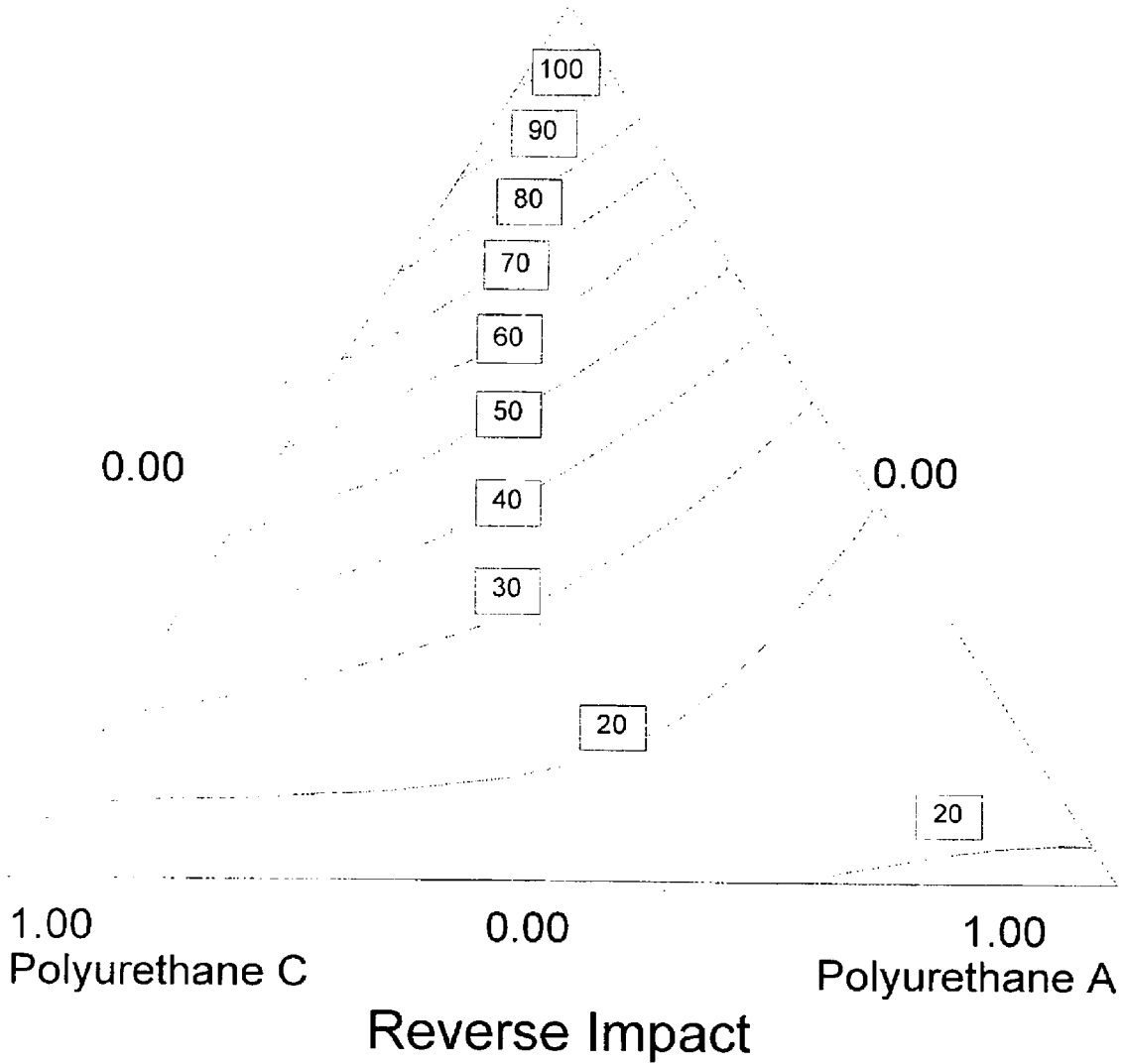

COATING COMPOSITIONS CONTAINING ETHYLENICALLY UNSATURATED POLYURETHANES AS BINDERS

BACKGROUND OF THE INVENTION

1. Field of the Invention

The present invention relates to coating compositions containing a mixture of at least two ethylenically unsaturated polyurethanes as binders.

2. Description of the Prior Art

UV curable coatings are one of the fastest growing sectors in the coatings industry. In recent years, UV technology has made inroads into a number of market segments like fiber optics, optical- and pressure-sensitive adhesives, automotive applications like UV cured topcoats, and UV curable powder coatings. The driving force of this development is mostly the quest for an increase in productivity of the coating and curing process. In automotive refinish applications where minor repairs need to be performed swiftly and at ambient temperature, UV technology promises to significantly increase the throughput of cars in a body shop. The development of refinish applications breaks new ground in UV technology. Safety concerns associated with the use of UV lamps in body shops as well as economic constraints will likely preclude the use of high intensity light sources. Relatively inexpensive low intensity lamps that emit only in the UV-A region of the electromagnetic spectrum are taking their place, thus posing new challenges to resin developers and formulators.

UV curable coating compositions are known in the art. See, e.g., U.S. Pat. Nos. 4,188,472; 4,340,497; 6,465,539; and 6,534,128; and published PCT applications WO 97/04881 and WO 03/027162. In addition, U.S. Pat. No. 5,777,024 is directed to the reaction product of a low viscosity isocyanurate group-containing polyisocyanate, which has been modified with allophanate groups to reduce its viscosity, with hydroxyl-functional ethylenically unsaturated compounds such as hydroxyalkyl (meth)acrylates and lactone modified versions of these (meth)acrylates. U.S. Pat. No. 6,306,504 is directed to a coating composition for polycarbonate which contains the reaction product of a low viscosity polyisocyanate, such as a low viscosity isocyanurate group-containing polyisocyanate, with a low molecular weight, hydroxyalkyl acrylate. Japanese Kokai 2004-338214 is directed to a coating composition containing a mixture of the reaction product of an isocyanurate group-containing polyisocyanate with 3-acryloyloxy-2-hydroxypropyl methacrylate and a copolymerizable monomer. Japanese Kokai 2004-059820 is directed to a photocurable composition prepared by reacting a 2-hydroxyethyl methacrylate-isobornyl methacrylate-methylmethacrylate copolymer with the reaction product of isophorone diisocyanate and 3-acryloyloxy-2-hydroxypropyl methacrylate and mixing the resulting product with a urethane acrylate oligomer. Finally, Japanese Kokai 2003-342525 is directed to a coating composition containing the reaction product of an isocyanurate group-containing polyisocyanate with 2-hydroxy-3-allyloxypropyl methacrylate.

Also known are compositions that are curable using UV radiation having a very low UV-B content and substantially no UV-C content (see, e.g., U.S. Patent Application Publication 2003/0059555 and U.S. Pat. No. 6,538,044). In order to be commercially useful as a clear coat, particularly for the refinish market, a coating composition must be curable in a relatively short time, preferably under relatively low intensity radiation. In addition, such coatings must exhibit a balance between hardness (as measured by pendulum hardness) and flexibility (as measured by impact resistance). None of the coating compositions described in the above literature meet these criteria.

Copending application, U.S. Ser. No. 10/754,244, filed Jan. 9, 2004, is directed to UV curable coating compositions containing a mixture of two urethane acrylates. One of the urethane acrylates is prepared by reacting a polyisocyanate with a lactone-acrylate adduct and the other is prepared by reacting a polyisocyanate with a hydroxyalkyl (meth)acrylate. While coatings prepared from these urethane acrylate mixtures possess a combination of hardness and flexibility, to obtain the hardnesses required for certain applications, such as automotive refinish applications, it is necessary to add di-, tri-, and tetra-acrylates to the coating compositions as reactive diluents.

Accordingly, it is an object of the present invention to reduce or eliminate the need for reactive diluents and still achieve the combination of hardness and flexibility that is required for certain applications, such as automotive refinish applications. This object may be achieved with the compositions of the present invention which are described in more detail hereinafter.

SUMMARY OF THE INVENTION

The present invention relates to a binder-containing coating composition, which may be cured by free radical polymerization, wherein the binder resins contain A) about 10 to 95% by weight of the reaction product of
  i) one or more polyisocyanates with
  ii) a hydroxyl component containing
    ii-a) one or more hydroxyl compounds containing two ethylenically unsaturated groups and corresponding to formula I $$CH_2=C(R^1)-C(O)-O-R^2-CH_2-O-R^3 \quad (I)$$

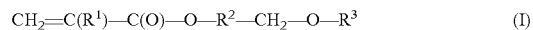

wherein
$R^1$ is H or $CH_3$,
$R^2$ is $-CH(CH_2OH)-$ or $-CH_2CH(OH)-$,
$R^3$ is $-C(O)-C(R^1)=CHR^8$ or $-CH_2CH=CHR^8$ and
$R^8$ is H, $CH_3$ or phenyl, and
    ii-b) up to 30 hydroxyl equivalent %, based on the total hydroxyl equivalents of component A-ii), of a hydroxyl compound other than A-ii-a), which has a number average molecular weight of 32 to 400,
  wherein the NCO:OH equivalent ratio of component A-i) to component A-ii) is 1.10:1 to 1:1.10,
B) 0 to about 60% by weight of the reaction product of
  i) one or more polyisocyanates with
  ii) a hydroxyl component containing
    ii-a) one or more hydroxy functional lactone ester (meth)acrylates having a number average molecular weight of about 200 to 2000 and corresponding to formula II $$CH_2=C(R^1)-C(O)-O-R^4-[O-C(O)-R^5]_n-OH \quad (II)$$

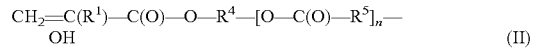

wherein
n is an integer from 1 to 5,
$R^1$ is as defined above,
$R^4$ represents an alkylene group or substituted alkylene group having 2 to 10 carbon atoms, which may be substituted with one or more alkyl groups having 1 to 12 carbon atoms, and R⁵ represents a straight or branched chain alkylene group having 3 to 8 carbon atoms, which may be substituted with one or more alkyl groups having 1 to 12 carbon atoms, and ii-b) up to 30 hydroxyl equivalent %, based on the total hydroxyl equivalents of component B-ii), of a hydroxyl compound other than B-ii-a which has a number average molecular weight of 32 to 400, wherein the NCO:OH equivalent ratio of component B-i) to component B-ii) is 1.10:1 to 1:1.10, C) 0 to about 85% by weight of the reaction product of
i) one or more polyisocyanates with
ii) a hydroxyl component containing
ii-a) one or more hydroxy functional (meth)acrylates corresponding to formula III $$HO-R^4-O-C(O)-C(R^1)=CH_2 \qquad (III)$$

wherein R¹ and R⁴ are as defined above and ii-b) up to 30 hydroxyl equivalent %, based on the total hydroxyl equivalents of component C-ii), of a hydroxyl compound other than C-ii-a), which has a number average molecular weight of 32 to 400, wherein the NCO:OH equivalent ratio of component C-i) to component C-ii) is 1.10:1 to 1:1.10, wherein the coating composition additionally contains D) 0 to about 100% by weight of one or more copolymerizable monomers containing 1 to 4 ethylenically unsaturated groups, and E) 0 to about 150% by weight of one or more inert organic solvents, wherein i) the %'s by weight of components A), B) and C) total 100%, based on the total weight of components A), B) and C); ii) the %'s by weight of components D) and E) are based on the total weight of components A), B) and C); iii) the %'s by weight of components B) and C) are present in a total amount of at least 5% by weight; and iv) components D) and E) are present in a total amount of at least about 10% by weight.

The present invention also relates to a process for coating a substrate using the coating compositions according to the invention.

BRIEF DESCRIPTION OF THE DRAWINGS

FIG. 5 represents a graph of the difference between the fourteen day hardness data and the one day hardness data for coatings prepared from the coating compositions according to the invention.

FIG. 6 represents a graph of the fourteen day impact resistance data for coatings prepared from the coating compositions according to the invention.

DETAILED DESCRIPTION OF THE INVENTION

Figure 1:
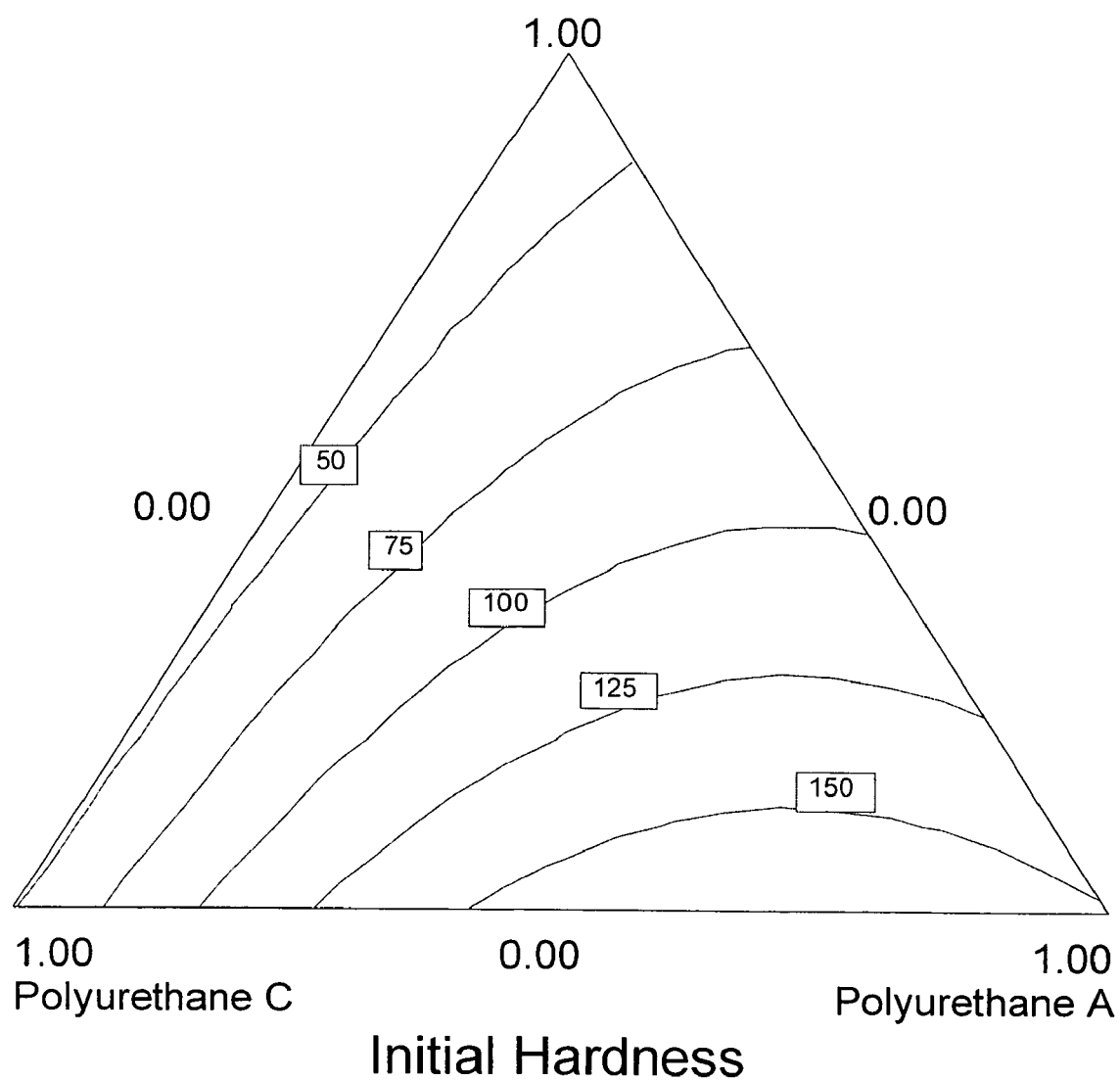
FIG. 1 represents a graph of the initial hardness data for coatings prepared from the coating compositions according to the invention.

The coating compositions according to the present invention contain binder resins A) and B) and optionally contain binder resin C), which are all polyurethanes containing ethylenically unsaturated groups. The coating compositions also contain one or both of copolymerizable monomers D) and inert organic solvents E). Copolymerizable monomers D) are not binder resins, but they do form part of the binder of the coating compositions because they are reacted into the ultimate coatings. Inert organic solvents E) are not part of the binder of the coating compositions because they are not reacted into the ultimate coatings.

Component A) is present in the coating compositions of the present invention in an amount of about 10 to 95% by weight, preferably about 10 to 80% by weight and more preferably about 10 to 60% by weight, based on the total weight of components A), B) and C).

Component A) is the reaction product of
i) one or more polyisocyanates with
ii) a hydroxyl component containing
ii-a) one or more hydroxyl compounds containing two ethylenically unsaturated groups and corresponding to formula I

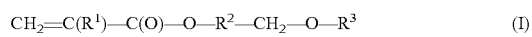
$$CH_2=C(R^1)-C(O)-O-R^2-CH_2-O-R^3 \qquad (I)$$

wherein
R¹ is H or CH₃,
R² is —CH(CH₂OH)— or —CH₂CH(OH)— and
R³ is —C(O)—C(R¹)=CHR⁸ or —CH₂CH=CHR⁸, preferably —C(O)—C(R¹)=CH₂ and more preferably R¹ is CH₃, and
R⁸ is H, CH₃ or phenyl, preferably H or CH₃ and more preferably H, and ii-b) up to 30 hydroxyl equivalent %, based on the total hydroxyl equivalents of component A-ii), of a hydroxyl compound other than A-ii-a), which has a number average molecular weight of 32 to 400, wherein the NCO:OH equivalent ratio of component A-i) to component A-ii) is 1.10:1 to 1:1.10, preferably 1.05:1 to 1:1.05 and more preferably 1.02:1 to 1:1.02.

Suitable polyisocyanates A-i) include substantially any organic diisocyanate and/or polyisocyanate. Aromatic, araliphatic, aliphatic or cycloaliphatic di- and/or polyisocyanates and mixtures of such isocyanates may be used. Examples include monomeric diisocyanates of the formula R⁶(NCO)₂, wherein R⁶ represents an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 15 carbon atoms. Specific examples of suitable monomeric diisocyanates include xylylene diisocyanate, tetramethylene diisocyanate, 1,4-diisocyantobutane, 1,12-diisocyanatododecane, hexamethylene diisocyanate, 2,3,3-trimethylhexamethylene diisocyanate, 1,4-cyclohexylene diisocyanate, 4,4'-dicyclohexylmethane diisocyanate, 4,4'-dicyclohexyl diisocyanate, 1-diisocyanato-3,3,5-trimethyl-5-isocyanatomethylcyclohexane (isophorone diisocyanate), 1,4-phenylene diisocyanate, 2,6-tolylene diisocyanate, 2,4-tolylene diisocyanate, 1,5-naphthylene diisocyanate, 2,4'- or 4,4'-diphenylmethane diisocyanate, 4,4'-diphenyldimethylmethane diisocyanate, α,α,α',α'-tetramethyl-m- or -p-xylylene diisocyanate, and triphenylmethane 4,4',4"-triisocyanate as well as mixtures thereof. Hexamethylene diisocyanate, 4,4'-dicyclohexylmethane diisocyanate and isophorone diisocyanate and the mixtures thereof are the presently preferred isocyanates. Also suitable are monomeric triisocyanates such as 4-isocyanatomethyl-1,8-octamethylene diisocyanate.

Polyisocyanate adducts containing isocyanurate, iminooxadiazine dione, urethane, biuret, allophanate, uretidione and/or carbodiimide groups are also useful as the polyisocyanate component A-i). The polyisocyanate adducts may have isocyanate functionalities of 3 or more and may be prepared by the trimerization or oligomerization of diisocyanates or by the reaction of diisocyanates with polyfunctional compounds containing hydroxyl or amine groups. Preferred are polyisocyanate adducts containing isocyanurate groups and prepared from hexamethylene diisocyanate, e.g., in accordance with U.S. Pat. No. 4,324,879.

Especially preferred are low viscosity polyisocyanates having a viscosity at 23° C. and at 100% solids of less than 2000 mPa·s, preferably less than 1500 and more preferably 800 to 1400 mPa·s. Examples of these polyisocyanates include isocyanurate group-containing polyisocyanate adducts prepared by trimerizing hexamethylene diisocyanate until the reaction mixture has an NCO content of 42 to 45, preferably 42.5 to 44.5 wt. %, subsequently terminating the reaction and removing unreacted hexamethylene diisocyanate by distillation to a residual content of less than 0.5 wt. %; uretdione group-containing polyisocyanate adducts which may present in admixture with isocyanurate group-containing polyisocyanate adducts; biuret group-containing polyisocyanate adducts which may be prepared according to the processes disclosed in U.S. Pat. Nos. 3,124,605; 3,358,010; 3,903,126; and 3,903,127; isocyanurate and allophanate group-containing polyisocyanate adducts which may be prepared in accordance with the processes set forth in U.S. Pat. Nos. 5,124,427, 5,208,334 and 5,235,018; and iminooxadiazine dione and optionally isocyanurate group-containing polyisocyanate adducts which may be prepared in the presence of special fluorine-containing catalysts as described in DE-A 19611849.

Suitable hydroxyl compounds A-ii-a) contain two ethylenically unsaturated groups and correspond to formula I. These compounds are based on the reaction product of acrylic and/or methacrylic acid, preferably acrylic acid, with glycidyl acrylate, glycidyl methacrylate, glycidyl cinnamate, glycidyl crotonate, glycidyl allyl ether, glycidyl cinnamyl ether and/or glycidyl crotyl ether, preferably glycidyl methacrylate. These compounds may be prepared by mixing the acid and glycidyl adduct in essentially equivalent amounts or by using a small excess of the acid, optionally in the presence of a catalyst and in the presence of an inhibitor to prevent premature reaction of the ethylenically unsaturated groups. The reaction is continued at an elevated temperature of 50 to 100° C., preferably 60 to 80° C., until the acid number is at or below the theoretical amount.

Other hydroxyl compounds A-ii-b) may be saturated or unsaturated, preferably saturated, and include mono- to trihydric aliphatic alcohols having a number average molecular weight of 32 to 400, such as methanol, ethanol, n-hexanol, isooctanol, isododecanol, benzyl alcohol, ethylene glycol, diethylene glycol, propylene glycol, 2-ethyl-1,3-hexane diol, glycerol and alcohols obtained from these alcohols by alkoxylation.

For reaction with the isocyanate, hydroxyl component A-ii-a), optional hydroxyl component A-ii-b), isocyanate component A-i) and the inhibitor may be added to the reaction vessel in any order. The amounts of the reactants are selected such that the number of isocyanate groups of isocyanate component A-i) to the number of hydroxyl groups of hydroxyl component A-ii) is essentially equivalent, i.e., the NCO:OH equivalent ratio is 1.10:1 to 1:1.10, preferably 1.05:1 to 1:1.05 and more preferably 1.02:1 to 1:1.02. After the reactants have been added a catalytic amount of a urethane catalyst, e.g., dibutyl tin dilaurate, is added and the mixture is typically heated to a temperature of about 40 to 90° C., preferably about 60° C. During the initial reaction exotherm the temperature is maintained below 90° C. After the reaction mixture cools the temperature is maintained between 60° C. and 70° C. until the isocyanate content is <0.5% by weight as measured for example by titration with dibutyl amine. If the isocyanate content is too high, an additional amount of hydroxyl component A-ii) can be added to react with any remaining isocyanate groups. Thereafter, the product is cooled prior to storage.

Alternatively, either of the components A-i) or A-ii) can be added with the other additives and then the other reactant can be added. When the isocyanate component is added first, it is possible to initially add less than the total quantity of the hydroxyl component. After the reaction is essentially complete, the isocyanate content can be determined and then the remainder of the hydroxyl component can be added in an amount that is essentially equivalent to the number of isocyanate groups remaining.

Component B) is present in the coating compositions of the present invention in an amount of up to about 60% by weight, preferably up to about 55% by weight and more preferably up to about 50% by weight. When present Component B) is present in an amount of at least about 5% by weight, preferably at least about 10% by weight. The preceding percentages are based on the total weight of components A), B) and C).

Component B) is the reaction product of
i) one or more polyisocyanates with
ii) a hydroxyl component containing
  ii-a) one or more hydroxy functional lactone ester (meth)acrylates having a number average molecular weight of about 200 to 2000 and corresponding to formula II

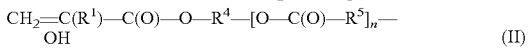

$$CH_2{=}C(R^1){-}C(O){-}O{-}R^4{-}[O{-}C(O){-}R^5]_n{-} \\ OH \qquad (II)$$

wherein
  n is an integer from 1 to 5, preferably 1 or 2 and more preferably 2,
  $R^1$ is as defined above,
  $R^4$ represents an alkylene group or substituted alkylene group having 2 to 10 carbon atoms, preferably 2 to 4 carbon atoms and more preferably 2 carbon atoms; which may be substituted with one or more alkyl groups having 1 to 12 carbon atoms, preferably one alkyl group and more preferably one methyl group, and
  $R^5$ represents a straight or branched chain alkylene group having 3 to 8 carbon atoms, preferably 5 carbon atoms; which may be substituted with one or more alkyl groups having 1 to 12 carbon atoms, but preferably is unsubstituted, and
  ii-b) up to 30 hydroxyl equivalent %, based on the total hydroxyl equivalents of component B-ii), of a hydroxyl compound other than B-ii-a), which has a number average molecular weight of 32 to 400, wherein the NCO:OH equivalent ratio of component B-i) to component B-ii) is 1.10:1 to 1:1.10, preferably 1.05:1 to 1:1.05 and more preferably 1.02:1 to 1:1.02.

The hydroxy functional lactone ester (meth)acrylates useful herein are known in the art. The esters (hereinafter "lactone-acrylate adducts") are prepared by reacting an appropriate lactone with an acrylate or methacrylate acid ester.

Lactones employed in the preparation of the lactone-acrylate adducts correspond to formula IV

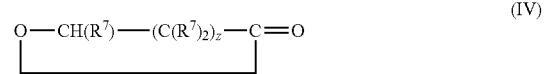

$$O{-}CH(R^7){-}(C(R^7)_2)_z{-}C{=}O \qquad (IV)$$

wherein $R^7$ is hydrogen or an alkyl group having 1 to 12 carbon atoms, and z is 2 to 7. Preferred lactones are the ε-caprolactones wherein z is 4 and at least 6 of the $R^7$'s are hydrogen with the remainder, if any, being alkyl groups.

Preferably, none of the substituents contain more than 12 carbon atoms and the total number of carbon atoms in these substituents on the lactone ring does not exceed 12. Unsubstituted ε-caprolactone, i.e., where each $R^7$ is hydrogen, is a derivative of 6-hydroxyhexanoic acid. Both the unsubstituted and substituted ε-caprolactones are available by reacting the corresponding cyclohexanone with an oxidizing agent such as peracetic acid.

Substituted ε-caprolactones found to be most suitable for preparing the present lactone-acrylate adducts are the various ε-monoalkylcaprolactones wherein the alkyl groups contain 1 to 12 carbon atoms, e.g., ε-methyl-caprolactone, ε-ethyl-caprolactone, ε-propyl-caprolactone and ε-dodecyl-caprolactone. Useful also are the ε-dialkylcaprolactones in which the two alkyl groups are substituted on the same or different carbon atoms, but not both on the omega carbon atoms.

Also useful are the ε-trialkylcaprolactones wherein 2 or 3 carbon atoms in the lactone ring are substituted provided, though, that the omega carbon atom is not di-substituted. The most preferred lactone starting reactant is ε-caprolactone wherein z in the lactone formula is 4 and each $R^5$ is hydrogen.

The acrylate or methacrylate acid esters utilized to prepare the lactone-acrylate adducts contain 1 to 3 acrylyl or α-substituted acrylyl groups and one or two hydroxyl groups. Such esters are commercially available and/or can be readily synthesized. Commercially available esters include the hydroxyalkyl acrylates or hydroxyalkyl methacrylates wherein the alkyl group contains 2 to 10 carbon atoms, preferably 2 to 4 carbon atoms. The hydroxyalkyl acrylates and methacrylates correspond to formula III

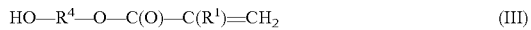

wherein $R^1$ and $R^4$ are as defined above.

Examples of suitable hydroxyalkyl acrylates and methacrylates include 2-hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate and 5-hydroxydecyl methacrylate.

Preferred lactone-acrylate adducts correspond to formula V

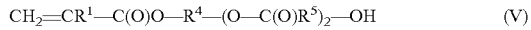

wherein $R^1$, $R^4$, and $R^5$ are as described above.

The lactone-acrylate adduct is prepared by reacting the lactone with the hydroxyalkyl acrylate in the presence of less than about 200 parts per million of a catalyst. The catalysts which may be used include one or more organometallic compounds and other metallic compounds such as stannic chloride or ferric chloride and other Lewis or protonic acids. Preferred catalysts include stannous octoate, dibutyltin dilaurate, and other tin compounds; titanates such as tetraisopropyl titanate and butyl titanate; the like. The reaction can be carried out at a temperature of about 100° C. to 400° C., preferably about 120° C. to 130° C. The reaction may be carried out at atmospheric pressure, although higher or lower pressures may be used. The reaction is generally carried out in the presence of oxygen to inhibit polymerization of the hydroxyalkyl acrylate. The reaction is generally carried out for a period of about 2 to 20 hours. The reaction is carried out in the presence of a suitable inhibitor to prevent polymerization of the hydroxyalkyl acrylate double bond. These inhibitors include the monomethyl ether of hydroquinone, benzoquinone, phenothiazine, methyl hydroquinone, 2,5-di-t-butylquinone, hydroquinone, benzoquinone and other common free radical inhibitors known in the art. The level of inhibitor used is less than 1000 parts per million, preferably less than 800 parts per million, and most preferably, less than 600 parts per million. The molar ratio of the lactone to hydroxyl groups in the ester is about 1:0.1 to 1:5, and preferably about 1:0.3 to 1:3.

An example of a lactone-acrylate adduct preferred for use in the present invention is a caprolactone-2-hydroxyethyl acrylate adduct supplied by Dow under the tradename Tone M-100, which corresponds to formula VI

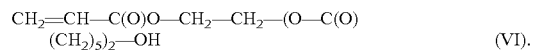

While a preferred embodiment of the invention contains two molecules of lactone, on the average, per acrylate group, useful products can have one to five lactone units per acrylate group, or can be a mixture of compounds that contain one to five lactone units. In addition to caprolactone, the lactone units could be derived from other lactones such as beta-propiolactone, delta-valerolactone, delta-butyrolactone, zeta-enantholactone, and eta-caprylolactone, or substituted lactones such as 6-methyl-epsilon-caprolactone, 3-methyl-epsilon-caprolactone, 5-methyl-epsilon-caprolactone, 4-methyl-delta-valerolactone, and 3,5-dimethyl-epsilon caprolactone.

Suitable isocyanates B-i) for preparing component B) are those previously described for the preparation of Component A), and can be the same as or different from the isocyanate used to prepare Component A). Similarly, suitable hydroxyl compounds B-ii-b) are those previously set forth as suitable for use as component A-ii-b).

The reaction of isocyanate component B-i) with hydroxyl component B-ii) is generally carried out in the manner described for preparing component A), including the reactants, their amounts and the reaction conditions.

Further details as to the production of the lactone esters and/or the reaction products of the lactone esters with isocyanates can be found in U.S. Pat. Nos. 4,188,472, 4,340,497, 4,429,082, 4,504,635, 4,683,287, 6,465,539 and 6,534,128 (the disclosures of which are herein incorporated by reference), WO 97/04881, WO 03/027162, and German Offenlegungsschrift 2,914,982.

Component C) is present in the coating compositions of the present invention in an amount of up to about 90% by weight, preferably up to about 85% by weight and more preferably up to about 70% by weight. When present Component C) is present in an amount of at least about 5% by weight, preferably at least about 10% by weight. The preceding percentages are based on the total weight of components A), B) and C).

Component C) is the reaction product of
i) one or more polyisocyanates with
ii) a hydroxyl component containing
   ii-a) one or more hydroxy functional (meth)acrylates corresponding to formula III

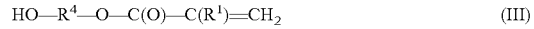

wherein
   $R^1$ and $R^4$ are as defined above, including the preferred and more preferred limitations, and
   ii-b) up to 30 hydroxyl equivalent %, based on the total hydroxyl equivalents of component C-ii), of a hydroxyl compound other than C-ii-a), which has a number average molecular weight of 32 to 400,
wherein the NCO:OH equivalent ratio of component B-i) to component B-ii) is 1.10:1 to 1:1.10, preferably 1.05:1 to 1:1.05 and more preferably 1.02:1 to 1:1.02.

Suitable isocyanates C-i) are those previously described for the preparation of Components A) and B), and can be the same as or different from the isocyanate used to prepare Components A) and B). Similarly, suitable useful hydroxy functional (meth)acrylates C-ii-a) are those described for use in producing the lactone esters B-ii-a) and suitable hydroxyl compounds C-ii-b) are those previously set forth as suitable for use as component A-ii-b).

The reaction of isocyanate component C-i) with hydroxyl component C-ii) is generally carried out in the manner described for preparing component A), including the reactants, their amounts and the reaction conditions.

It is also possible in accordance with the present invention to prepare two or more of components A), B) and C) in one step by reacting one or more polyisocyanates with two or more of unsaturated hydroxyl components A-ii-a), B-ii-a) and C-ii-a and optionally hydroxyl component ii-b). This embodiment is especially useful if the same polyisocyanate is used to prepare two or more of components A), B) and C. However, it is possible to use this embodiment even when different polyisocyanates are used to prepare components A), B) and C).

Prior to their use in the coating compositions according to the invention the ethylenically unsaturated polyurethanes may be blended with known additives. Examples of these additives include wetting agents, flow control agents, antiskinning agents, antifoaming agents, matting agents, (such as silica, aluminum silicates and high-boiling waxes), viscosity regulators, pigments (including both organic and inorganic pigments), dyes, UV absorbers and stabilizers against thermal and oxidative degradation.

Other additives include copolymerizable monomers D) and inert organic solvents E), preferably copolymerizable monomers D). Suitable copolymerizable monomers are selected from organic compounds which contain 1 to 4, preferably 2 to 4, ethylenically unsaturated groups, and preferably have a viscosity of not more than 1000, more preferably not more than 500 mPa·s at 23° C., such as di- and polyacrylates and di- and polymethacrylates of glycols having 2 to 6 carbon atoms and polyols having 3 to 4 hydroxyl groups and 3 to 6 carbon atoms.

Examples include ethylene glycol diacrylate, propane 1,3-diol diacrylate, butane 1,4-diol diacrylate, hexane 1,6-diol diacrylate, trimethylol-propane triacrylate, pentaerythritol tri- and tetraacrylate, and the corresponding methacrylates. Also suitable are di(meth)acrylates of polyether glycols of initiated with ethylene glycol, propane 1,3-diol, butane 1,4-diol; triacrylates of the reaction products of 1 mole of trimethylol-propane with 2.5 to 5 moles of ethylene oxide and/or propylene oxide; and tri- and tetraacrylates of the reaction products of 1 mole of pentaerythritol with 3 to 6 moles of ethylene oxide and/or propylene oxide. Other copolymerizable monomers include aromatic vinyl compounds such as styrene; vinyl alkyl ethers such as vinylbutyl ether or triethylene glycol divinyl ether; and allyl compounds such as triallylisocyanurate. Preferably, the copolymerizable monomers have functionalities of two or more.

Examples of suitable inert solvents E) include those known from polyurethane coating technology such as toluene, xylene, cyclohexane, butyl acetate, ethyl acetate, ethyl glycol acetate, methoxypropyl acetate (MPA), acetone, methyl ethyl ketone and mixtures thereof.

While the presence of both copolymerizable monomers D) and inert organic solvents E) is not required, at least one must be present in the coating compositions according to the invention. Copolymerizable monomers D) are present in a maximum total amount of about 100% by weight, preferably about 60% by weight and more preferably about 40% by weight, based on the total weight of components A), B) and C). Inert organic solvents E) are present in a maximum total amount of about 150% by weight, preferably about 100% by weight and more preferably about 50% by weight, based on the total weight of components A), B) and C). The minimum combined amount of copolymerizable monomer D) and inert organic solvent E) is at least about 10% by weight, preferably at least about 15% by weight and more preferably at least about 20% by weight, based on the total weight of components A), B) and C).

The coating compositions may be used to coat substrates of any kind, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented lacquers.

After the optional evaporation of a portion or all of any inert solvents used, the coatings may be crosslinked by free radical polymerization by using high energy radiation; low energy radiation (preferably having a wavelength of at least 320 nm, more preferably about 320 to 500 nm), such as UV or visible light; electron beams; γ rays; mercury, xenon, halogen or carbon arc lamps; sunlight; radioactive sources; by heating to elevated temperatures in the presence of peroxides or azo compounds; or by curing with metal salts of siccative acids and optionally (hydro)peroxides at either elevated temperatures or at temperatures of room temperature or below.

When the coatings are crosslinked by UV irradiation, photoinitiators are added to the coating composition. Suitable photoinitiators are known and include those described in the book by J. Korsar entitled "Light-Sensitive Systems", J. Wiley & Sons, New York-London-Sydney, 1976, and in Houben-Weyl, Methoden der Organischen Chemie, Volume E 20, page 80 et seq, Georg Thieme Verlag, Stuttgart, 1987.

Particularly suitable photoinitiators include benzoin ethers such as benzoin isopropyl ether, benzil ketals such as benzil dimethylketal, and hydroxyalkyl phenones such as 1-phenyl-2-hydroxy-2-methylpropan-1-one. The photoinitiators may be added in amounts, depending upon the application, of 0.1 to 10%, preferably 0.1 to 5% by weight, based on the weight of the ethylenically unsaturated polyurethanes and any other copolymerizable monomers. The photoinitiators may be added individually or may be used as mixtures to obtain advantageous synergistic effects.

To cure the coating compositions at elevated temperatures, curing must be conducted in the presence of 0.1 to 10%, preferably 0.1 to 5% by weight, based on the weight of the ethylenically unsaturated polyurethanes, of initiators such as peroxides or azo compounds. Temperatures of 80 to 240° C., preferably 120 to 160° C., are needed to cure the coating compositions at elevated temperatures.

Suitable initiators include the known free-radical initiators, e.g., aliphatic azo compounds such as azodiisobutyronitrile, azo-bis-2-methyl-valeronitrile, 1,1'-azo-bis-1-cyclohexanenitrile and alkyl 2,2'-azo-bis-isobutyrates; symmetrical diacyl peroxides such as acetyl, propionyl or butyryl peroxide, benzoyl peroxides substituted by bromo, nitro, methyl or methoxy groups, and lauryl peroxides; symmetrical peroxydicarbonates such as diethyl, diisopropyl, dicyclohexyl and dibenzoyl peroxy-dicarbonate; tert-butyl peroxy-2-ethylhexanoate and tert-butyl perbenzoate; hydroperoxides such as tert-butyl hydroperoxide and cumene hydroperoxide; and dialkyl peroxides such as dicumyl peroxide, tert-butyl cumyl peroxide or ditert-butyl peroxide.

The coating compositions according to the invention may also be cured at room temperature in the presence of siccatives and optionally (hydro)peroxides, provided that a portion of the isocyanate groups have been reacted with β,γ-ethylenically unsaturated ether alcohols. Acryloyl groups cannot be cured by this method; however, once the allyl ether groups have been initiated, they can react with the (meth)acryloyl groups.

Suitable siccatives are known and include metal salts, preferably cobalt or vanadium salts, of acids such as linseed oil fatty acids, tall oil fatty acids and soybean oil fatty acids; resinic acids such as abietic acid and naphthenic acid; acetic acid; isooctanoic acid; and inorganic acids such as hydrochloric acid and sulfuric acid. Cobalt and vanadium compounds which are soluble in the coating compositions and act as siccatives are particularly suitable and include salts of the acids mentioned above and also commercial products such as "Vanadiumbeschleuniger VN-2 (Vanadium Accelerator VN-2)" marketed by Akzo. The siccatives are generally used in the form of organic solutions in quantities such that the metal content is 0.0005 to 1.0% by weight, preferably 0.001 to 0.5% by weight, based on the weight of the ethylenically unsaturated polyurethanes.

Examples of (hydro)peroxides include di-tert.-butyl peroxide, benzoyl peroxide, cyclohexanone peroxide, methyl ethyl ketone peroxide, acetyl acetone peroxide, dinonyl peroxide, bis-(4-tert.-butylcyclohexyl)-peroxy-dicarbonate, tert.-butyl hydroperoxide, cumene hydroperoxide, 2,5-dimethyl-hexane-2,5-hydroperoxide and diisopropyl benzene monohydroperoxide. The (hydro)peroxides are preferably used in quantities of 1 to 10% by weight, based on the weight of the ethylenically unsaturated polyurethanes.

When cured in the presence of cobalt and peroxides, the coating compositions generally cure over a period of 1 to 24 hours at 20° C. to form high-quality coatings. However, curing may also take place at lower temperatures (for example −5° C.) or more quickly at higher temperatures of up to 130° C.

When fully cured (regardless of the type of radiation used), the coatings exhibit hardnesses and impact resistances at least comparable to conventional coatings.

The examples that follow are intended to illustrate the invention without restricting its scope. All parts and percentages are by weight unless otherwise indicated.

EXAMPLES

Polyisocyanate 1

A low viscosity polyisocyanate adduct containing isocyanurate groups, prepared from 1,6-hexamethylene diisocyanate, and having a viscosity of 1145 cps@25° C. and an NCO content of 22.7% (Desmodur 3600, available from Bayer MaterialScience)

GAMA—Acrylic Acid Adduct of Glycidyl Methacrylate

Into a two liter round bottom flask fitted with stirrer, heater, dropping funnel and oxygen inlet tube were added 653 g (4.59 eq) of glycidyl methacrylate. 3.5 g of triphenyl phosphine catalyst and 1.0 g of butylated hydroxy toluene stabilizer. The mixture was stirred until homogenous and heated to 70° C. To the mixture were added 345.5 (4.79 eq) of acrylic acid over a one hour period. The reaction mixture was then heated to 90° C. and held at this temperature for twelve hours until the acid number was 12.8 mg KOH/g resin. An additional 1.0 g of triphenyl phosphine was added. The reaction was held at 90° C. an additional ten hours until the acid number was 3.4 mg KOH/g resin. The viscosity was 66 mPa·s and the density was 1.14 g/cc.

D4265

A 1:1 mixture of 2-hydroxy-2-methyl-1-phenyl-1-propan-1-one and bis(phenyl)-2,4,6-trimethylbenzoyl-phosphine oxide (Darocur 4265, available from Ciba Specialty Chemicals).

I184

1-Hydroxycyclohexyl phenyl ketone photoinitiator (Irgacure 184, available from Ciba Specialty Chemicals.

Preparation of Ethylenically Unsaturated Polyurethanes

Polyurethane A

Into a two liter round bottom flask fitted with stirrer, heater, dropping funnel and oxygen inlet tube were added 469.7 g (2.52 eq) of Polyisocyanate 1, 539.3 g (2.52 eq) of GAMA and 5.0 g of butylated hydroxy toluene stabilizer. The mixture was agitated until homogenous and then 0.06 g of dibutyltin dilaurate catalyst were added. The reaction mixture was then heated to 60° C. and held at this temperature for six hours until no isocyanate was seen in an IR spectrum. The polyurethane, after being diluted to 80% solids with 253.5 g of n-butyl acetate, had a viscosity of 3700 mPa·s and a density of 1.10 g/cc.

Polyurethane B

Into a three liter round bottom flask fitted with stirrer, heater, dropping funnel and oxygen inlet tube were added 72.7 g (0.815 eq) of Polyisocyanate 1, 280.5 g (0.815 eq) of a poly(ε-caprolactone) ester of 2-hydroxyethyl acrylate (Tone M 100, available from Dow Chemicals, hydroxyl equivalent weight—344) and 1.8 g of butylated hydroxy toluene stabilizer. The mixture was agitated until homogenous and then 0.06 g of dibutyltin dilaurate catalyst were added. The reaction mixture was then heated to 65° C. and held at this temperature for six hours until no isocyanate was seen in an IR spectrum. The polyurethane, after being diluted to 80% solids with 88.8 g of n-butyl acetate, had a viscosity of 1250 mPa·s and a density of 1.09 g/cc.

Polyurethane C

Into a two liter round bottom flask fitted with stirrer, heater, dropping funnel and oxygen inlet tube were added 995.3 g (5.451 eq) of Polyisocyanate 1, 366.1 g (3.153 eq) of hydroxyethyl acrylate (hydroxyl equivalent weight—116.1), 175.8 g (1.351 eq) of hydroxypropyl acrylate (hydroxyl equivalent weight—130.1), 394.5 g of butyl acetate and 0.8 g of butylated hydroxy toluene stabilizer. The mixture was agitated until homogenous and then 0.8 g of dibutyltin dilaurate catalyst were added. The reaction mixture was then heated to 60° C. and held at this temperature for six hours until the isocyanate content was 1.86% NCO (theoretical NCO—2.05%). 6.5 g (0.090 eq) of 2-ethyl hexane diol were added and heating was continued for an additional four and one-half hours until no isocyanate was seen in an IR spectrum. The polyurethane had a solids content of 80%, a viscosity of 6842 mPa·s and a density of 1.11 g/cc.

Examples 1-10

Formulation of Radiation Curable Coating Compositions

The polyurethanes (in the amounts set forth in Table 1) at 80% solids were combined with 2.3 parts of D4265 and 0.1 parts of I184 photoinitiators and 18.2 parts of n-butyl acetate to make solutions at 60% solids. The formulations are set forth in Table 1.

TABLE 1

| Formulation | Example | | | | | | | | | |
|---|---|---|---|---|---|---|---|---|---|---|
| | 1 comp | 2 comp | 3 comp | 4 comp | 5 | 6 | 7 | 8 comp | 9 | 10 |
| | Weight ratios | | | | | | | | | |
| Polyurethane B | 50 | 0 | 0 | 25 | 25 | 0 | 16.65 | 33.5 | 8.3 | 8.3 |
| Polyurethane C | 0 | 50 | 0 | 25 | 0 | 25 | 16.65 | 8.3 | 33.5 | 8.3 |
| Polyurethane A | 0 | 0 | 50 | 0 | 25 | 25 | 16.65 | 8.3 | 8.3 | 33.5 |
| D4265 | 2.3 | 2.3 | 2.3 | 2.3 | 2.3 | 2.3 | 2.3 | 2.3 | 2.3 | 2.3 |
| I184 | 0.1 | 0.1 | 0.1 | 0.1 | 0.1 | 0.1 | 0.1 | 0.1 | 0.1 | 0.1 |
| n-butyl acetate | 18.2 | 18.2 | 18.2 | 18.2 | 18.2 | 18.2 | 18.2 | 18.2 | 18.2 | 18.2 |

Formulation, Cure Procedure and Testing

The formulations were formed into films using a 4 mil wet film thickness draw down bar on both cold rolled steel panels for MEK double rub evaluations and glass panels for pendulum hardness evaluations. All panels were flashed for 30 seconds after draw down and cured for two minutes under a H&S Autoshot 400A Low Intensity UVA lamp at a lamp distance of 10 inches.

MEK double rubs was determined using a two pound ball peen hammer covered with several layers of cheesecloth. The cheesecloth was saturated with MEK. The MEK-wet hammer was placed on the coating surface such that the hammer is at a 90° angle to the surface. Without applying downward pressure, the hammer was pushed back and forth over an approximately 4" long area of the coating. One forward and back motion is counted as one double rub. The cloth was saturated with MEK after every twenty-five double rubs. The end-point was 100 double rubs or when the hammer broke through the substrate to the panel surface, whichever occurred first.

The pendulum hardness was determined using the (now withdrawn) ASTM D 4366-95 (Test Method A)-Standard Test Methods for hardness of Organic Coatings by Pendulum Damping Tests using a Koenig Hardness Instrument.

The reverse impact was determined using the ASTM D 2794-Standard Test Method for Resistance of Organic Coatings to Effects of Rapid Deformation.

The results are set forth in the Table 2.

The MEK double rubs demonstrate the benefit of using mixtures of the ethylenically unsaturated polyurethanes according to the invention. When the Polyurethane B was used alone the chemical resistance of the cured film as determined by MEK double rubs was poor. Also, when polyurethane A) was used alone the chemical resistance did not reach its highest value until after 14 days. The use of a mixture of Polyurethanes A) cured film as determined by MEK double rubs was poor. Also, when polyurethane A) was used alone the chemical resistance did not reach its highest value until after 14 days. The use of a mixture of Polyurethanes A) and B) or with a mixture of Polyurethanes A), B) and C) increased the chemical resistance.

Figure 2:
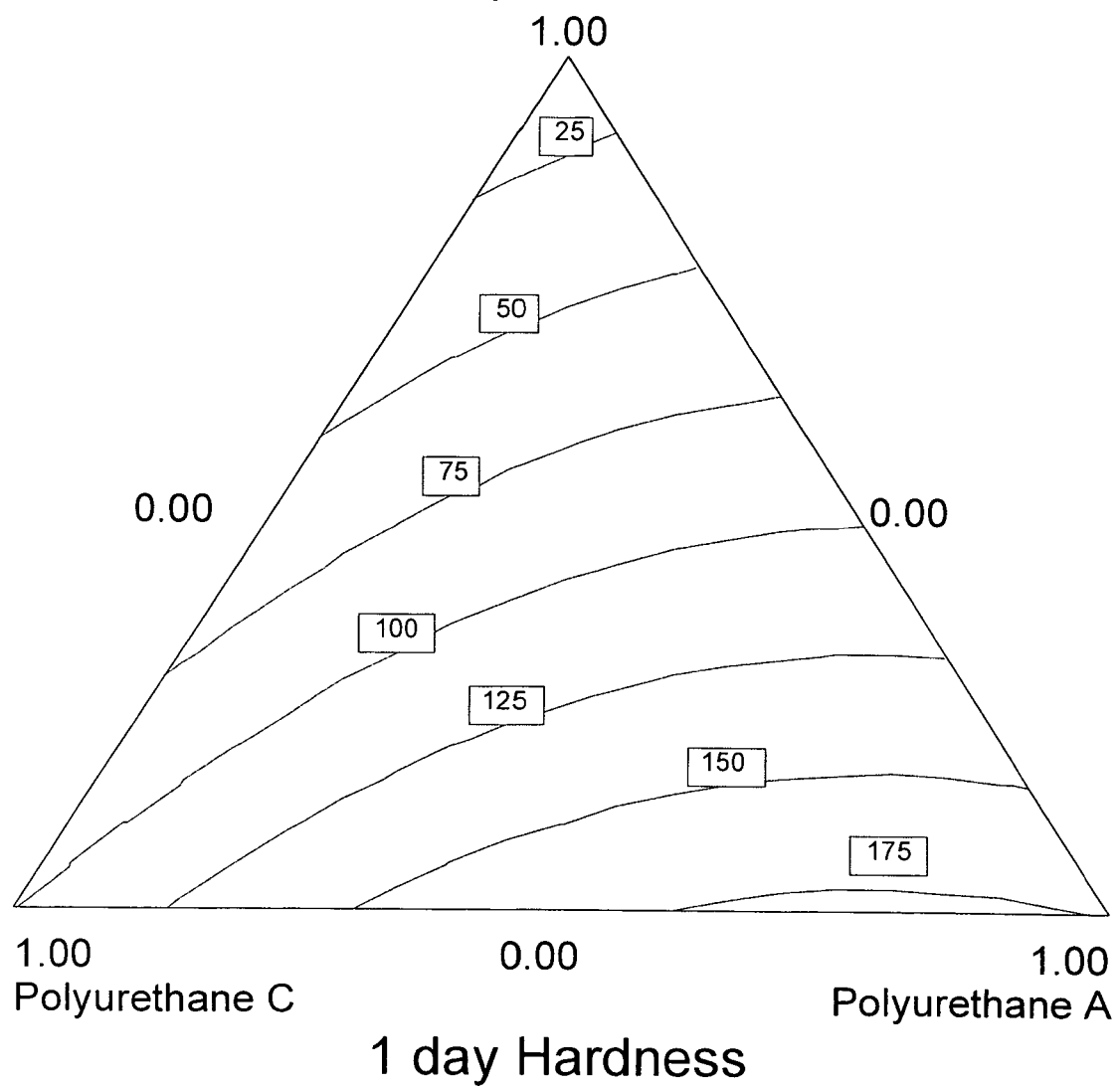
FIG. 2 represents a graph of the one day hardness data for coatings prepared from the coating compositions according to the invention.
Figure 3:
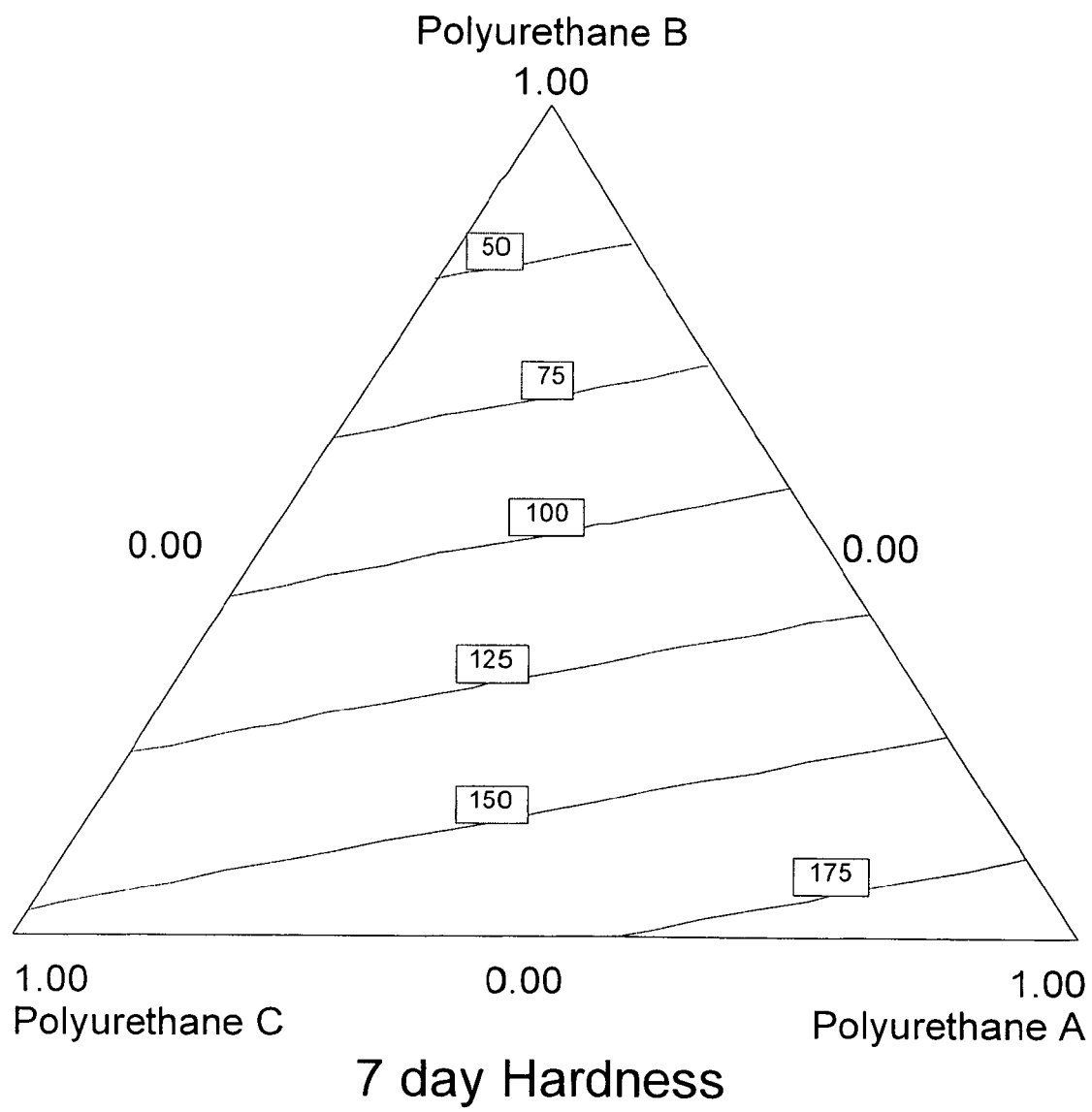
FIG. 3 represents a graph of the seven day hardness data for coatings prepared from the coating compositions according to the invention.
Figure 4:
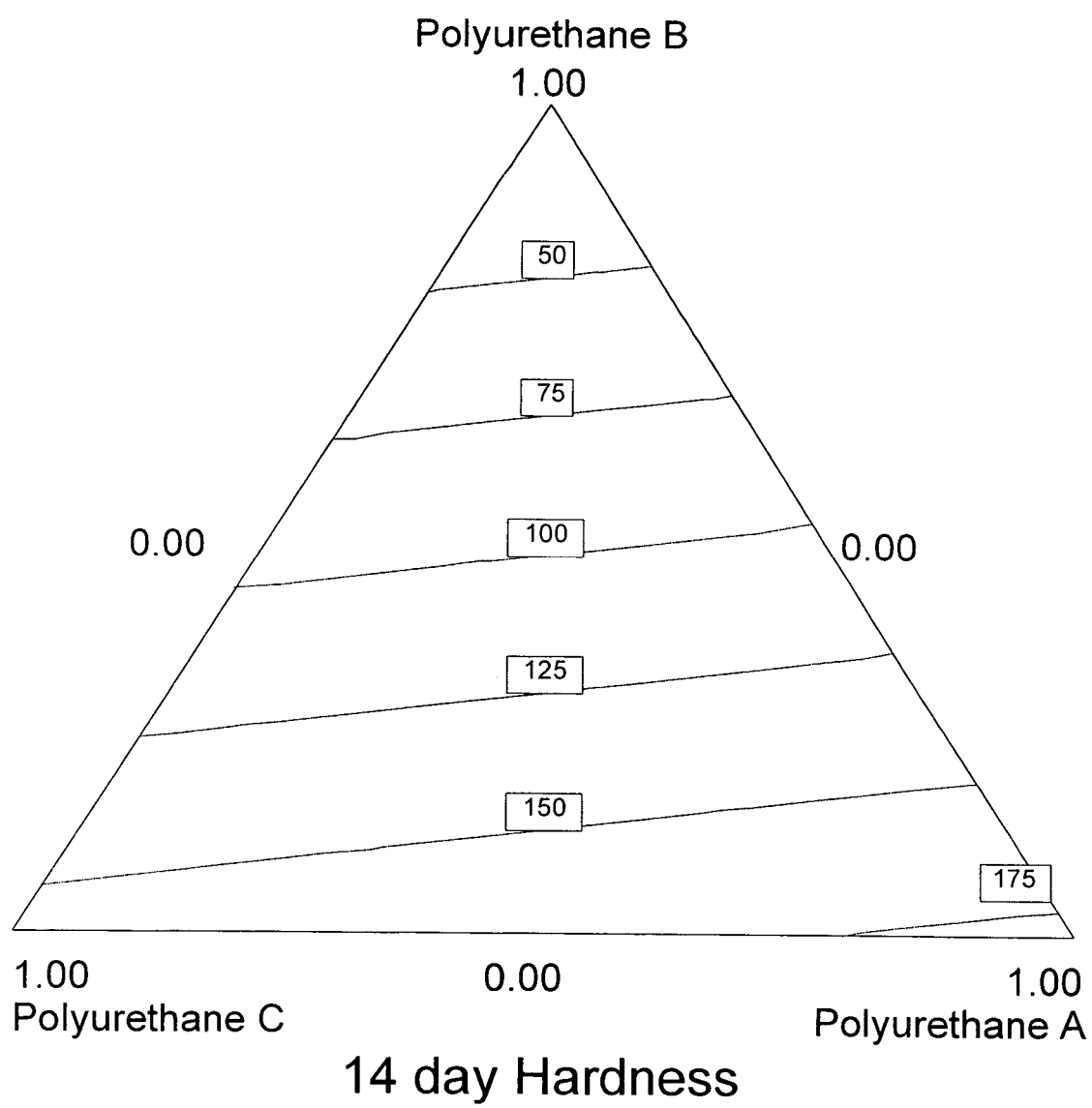
FIG. 4 represents a graph of the fourteen day hardness data for coatings prepared from the coating compositions according to the invention.

An examination of the pendulum hardness data shows that Polyurethane B) gave a cured film that softened as time passed. The Incorporation of either Polyurethane A) or a mixture of Polyurethanes A) and C) polyurethanes gave films that increased in hardness. The pendulum hardness data was treated to regression analysis to more easily see the effects on hardness as the amounts of Polyurethanes A), B) and C) were changed. FIGS. 1-4 set forth these results.

In addition a regression analysis was done on the difference in hardness between the 14 day hardness and the 1 day hardness. These results are set forth in FIG. 5.

Finally, the impact resistance data was treated to regression analysis to more easily see the effects on impact resistance as the amounts of Polyurethanes A), B) and C) were changed. FIG. 6 sets forth these results.

TABLE 2

| | Example | | | | | | | | | |
|---|---|---|---|---|---|---|---|---|---|---|
| | 1 comp | 2 comp | 3 comp | 4 comp | 5 | 6 | 7 | 8 comp | 9 | 10 |
| | Polyurethane ratios | | | | | | | | | |
| Polyurethane B | 100 | 0 | 0 | 50 | 50 | 0 | 33.34 | 66.7 | 16.65 | 16.65 |
| Polyurethane C | 0 | 100 | 0 | 50 | 0 | 50 | 33.33 | 16.65 | 66.7 | 16.65 |
| Polyurethane A | 0 | 0 | 100 | 0 | 50 | 50 | 33.33 | 16.65 | 16.65 | 66.7 |
| MEK Rubs | | | | | | | | | | |
| Initial | 90 | 100 | 100s | 100 | 100s | 100s | 100s | 100s | 100 | 100 |
| 1 day | 80 | 100s | 100s | 100 | 100 | 100 | 100s | 100 | 100s | 100 |
| 7 days | 75 | 100 | 100s | 100 | 100 | 100 | 100 | 100 | 100 | 100 |
| 14 days | 75 | 100 | 100 | 100 | 100 | 100 | 100 | 100 | 100 | 100 |
| Pendulum Hardness, sec | | | | | | | | | | |
| Initial | 59 | 45 | 163 | 36 | 80 | 155 | 102 | 41 | 112 | 141 |
| 1 day | 20 | 98 | 177 | 45 | 92 | 161 | 119 | 42 | 126 | 145 |
| 7 days | 17 | 147 | 179 | 84 | 118 | 175 | 141 | 67 | 142 | 156 |
| 14 days | 14 | 147 | 169 | 81 | 106 | 173 | 135 | 67 | 149 | 147 |
| 14 day minus 1 day | −45 | 102 | 6 | 45 | 26 | 18 | 33 | 27 | 37 | 6 |
| Reverse Impact, in-lbs | | | | | | | | | | |
| 14 days | 120 | 20 | 20 | 40 | 20 | 20 | 40 | 60 | 20 | 20 | s = softened

The tables clearly demonstrate that hardness decreases over time with formulations that predominantly use Polyurethane B; increases over time with formulations that predominantly use Polyurethane C; and is relatively stable with formulations that predominantly use Polyurethane A.

The tables also show that the reverse impact increases with increasing levels of Polyurethane B. However, all of the formulations of the examples give acceptable reverse impact.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A binder-containing coating composition, curable by free radical polymerization, wherein the binder resins comprise
    A) about 10 to 95% by weight of the reaction product of
        i) one or more polyisocyanate adducts containing isocyanurate, iminooxadiazine dione, urethane, biuret, allophanate, uretdione and/or carbodiimide groups with
        ii) a hydroxyl component containing
            ii-a) one or more hydroxyl compounds containing two ethylenically unsaturated groups and corresponding to formula I

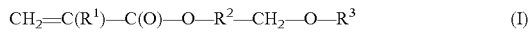

$$CH_2=C(R^1)-C(O)-O-R^2-CH_2-O-R^3 \quad (I)$$

wherein
            $R^1$ is H or $CH_3$,
            $R^2$ is $-CH(CH_2OH)-$ or $-CH_2CH(OH)-$,
            $R^3$ is $-C(O)-C(R^1)=CHR^8$ or $-CH_2CH=CHR^8$ and
            $R^8$ is H, $CH_3$ or phenyl, and
            ii-b) up to 30 hydroxyl equivalent %, based on the total hydroxyl equivalents of component A-ii), of a hydroxyl compound other than A-ii-a), which has a number average molecular weight of 32 to 400,
        wherein the NCO:OH equivalent ratio of component A-i) to component A-ii) is 1.10:1 to 1:1.10,
    B) 5 to about 60% by weight of the reaction product of
        i) one or more polyisocyanate adducts containing isocyanurate, iminooxadiazine dione, urethane, biuret, allophanate, uretidione and/or carbodiimide groups with
        ii) a hydroxyl component containing
            ii-a) one or more hydroxy functional lactone ester (meth)acrylates having a number average molecular weight of about 200 to 2000 and corresponding to formula II

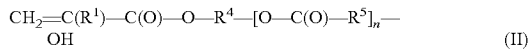

$$CH_2=C(R^1)-C(O)-O-R^4-[O-C(O)-R^5]_n-OH \quad (II)$$

wherein
            n is an integer from 1 to 5,
            $R^1$ is as defined above,
            $R^4$ represents an alkylene group or substituted alkylene group having 2 to 10 carbon atoms, which may be substituted with one or more alkyl groups having 1 to 12 carbon atoms, and
            $R^5$ represents a straight or branched chain alkylene group having 3 to 8 carbon atoms, which may be substituted with one or more alkyl groups having 1 to 12 carbon atoms, and
            ii-b) up to 30 hydroxyl equivalent %, based on the total hydroxyl equivalents of component B-ii), of a hydroxyl compound other than B-ii-a), which has a number average molecular weight of 32 to 400,
        wherein the NCO:OH equivalent ratio of component B-i) to component B-ii) is 1.10:1 to 1:1.10,
    C) 0 to about 85% by weight of the reaction product of
        i) one or more polyisocyanate adducts containing isocyanurate, iminooxadiazine dione, urethane, biuret, allophanate, uretdione and/or carbodiimide groups with
        ii) a hydroxyl component containing
            ii-a) one or more hydroxy functional (meth)acrylates corresponding to formula III

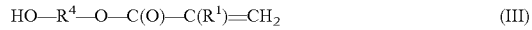

$$HO-R^4-O-C(O)-C(R^1)=CH_2 \quad (III)$$

wherein $R^1$ and $R^4$ are as defined above and
            ii-b) up to 30 hydroxyl equivalent %, based on the total hydroxyl equivalents of component C-ii), of a hydroxyl compound other than C-ii-a), which has a number average molecular weight of 32 to 400,
        wherein the NCO:OH equivalent ratio of component C-i) to component C-ii) is 1.10:1 to 1:1.10,
    wherein the coating composition additionally contains
    D) 0 to about 100% by weight of one or more copolymerizable monomers containing 1 to 4 ethylenically unsaturated groups, and
    E) 0 to about 150% by weight of one or more inert organic solvents,
    wherein i) the %'s by weight of components A), B) and C) total 100%, based on the total weight of components A), B) and C); ii) the %'s by weight of components D) and E) are based on the total weight of components A), B) and C); iii) the %'s by weight of components B) and C) are present in a total amount of at least 5% by weight; and iv) components D) and E) are present in a total amount of at least about 10% by weight.

2. The composition of claim 1 wherein isocyanate components A-i), B-i) and C-i) may be the same or different and comprise a polyisocyanate adduct having a viscosity at 23° C. and at 100% solids of less than 2000 mPa·s.

3. The composition of claim 2 wherein isocyanate components A-i), B-i) and C-i) may be the same or different and comprise a polyisocyanate adduct prepared from 1,6-hexamethylene diisocyanate.

4. The composition of claim 1 wherein in component A), $R^3$ is $-C(O)-C(R^1)=CH_2$; in component B), n is 2, $R^1$ is H, $R^4$ is $C_2$-alkylene, and $R^5$ is a $C_5$-alkylene; and in component C), $R^4$ is $C_2$-$C_4$-alkylene, which may be substituted with a methyl group.

5. The composition of claim 2 wherein in component A), $R^3$ is $-C(O)-C(R^1)=CH_2$; in component B), n is 2, $R^1$ is H, $R^4$ is $C_2$-alkylene, and $R^5$ is a $C_5$-alkylene; and in component C), $R^4$ is $C_2$-$C_4$-alkylene, which may be substituted with a methyl group.

6. The composition of claim 3 wherein in component A), $R^3$ is $-C(O)-C(R^1)=CH_2$; in component B), n is 2, $R^1$ is H, $R^4$ is $C_2$-alkylene, and $R^5$ is a $C_5$-alkylene; and in component C), $R^4$ is $C_2$-$C_4$-alkylene, which may be substituted with a methyl group.

7. A process for preparing a coated substrate comprising coating a substrate with a binder-containing coating composition and curing said coating composition by free radical polymerization, wherein the binder resins comprise
    A) about 10 to 95% by weight of the reaction product of
        i) one or more polyisocyanate adducts containing isocyanurate, iminooxadiazine dione, urethane, biuret, allophanate, uretdione and/or carbodiimide groups with ii) a hydroxyl component containing
  ii-a) one or more hydroxyl compounds containing two ethylenically unsaturated groups and corresponding to formula I $$CH_2=C(R^1)—C(O)—O—R^2—CH_2—O—R^3 \quad (I)$$

wherein
  $R^1$ is H or $CH_3$,
  $R^2$ is $—CH(CH_2OH)—$ or $—CH_2CH(OH)—$ and
  $R^3$ is $—C(O)—C(R^1)=CHR^8$ or $—CH_2CH=CHR^8$ and
  $R^8$ is H, $CH_3$ or phenyl, and
  ii-b) up to 30 hydroxyl equivalent %, based on the total hydroxyl equivalents of component A-ii), of a hydroxyl compound other than A-ii-a), which has a number average molecular weight of 32 to 400,
  wherein the NCO:OH equivalent ratio of component A-i) to component A-ii) is 1.10:1 to 1:1.10,
B) 5 to about 60% by weight of the reaction product of
  i) one or more polyisocyanate adducts containing isocyanurate, iminooxadiazine dione, urethane, biuret, allophanate, uretdione and/or carbodiimide groups with
  ii) a hydroxyl component containing
    ii-a) one or more hydroxy functional lactone ester (meth)acrylates having a number average molecular weight of about 200 to 2000 and corresponding to formula II $$CH_2=C(R^1)—C(O)—O—R^4—[O—C(O)—R^5]_n—OH \quad (II)$$

wherein
    n is an integer from 1 to 5,
    $R^1$ is as defined above,
    $R^4$ represents an alkylene group or substituted alkylene group having 2 to 10 carbon atoms, which may be substituted with one or more alkyl groups having 1 to 12 carbon atoms, and
    $R^5$ represents a straight or branched chain alkylene group having 3 to 8 carbon atoms, which may be substituted with one or more alkyl groups having 1 to 12 carbon atoms, and
    ii-b) up to 30 hydroxyl equivalent %, based on the total hydroxyl equivalents of component B-ii), of a hydroxyl compound other than B-ii-a), which has a number average molecular weight of 32 to 400,
  wherein the NCO:OH equivalent ratio of component B-i) to component B-ii) is 1.10:1 to 1:1.10,
C) 0 to about 85% by weight of the reaction product of
  i) one or more polyisocyanate adducts containing isocyanurate, iminooxadiazine dione, urethane, biuret, allophanate, uretdione and/or carbodiimide groups with
  ii) a hydroxyl component containing
    ii-a) one or more hydroxy functional (meth)acrylates corresponding to formula III $$HO—R^4—O—C(O)—C(R^1)=CH_2 \quad (III)$$

wherein $R^1$ and $R^4$ are as defined above and
    ii-b) up to 30 hydroxyl equivalent %, based on the total hydroxyl equivalents of component C-ii), of a hydroxyl compound other than C-ii-a), which has a number average molecular weight of 32 to 400,
  wherein the NCO:OH equivalent ratio of component C-i) to component C-ii) is 1.10:1 to 1:1.10,
wherein the coating composition additionally contains
D) 0 to about 100% by weight of one or more copolymerizable monomers containing 1 to 4 ethylenically unsaturated groups, and
E) 0 to about 150% by weight of one or more inert organic solvents,
wherein i) the %'s by weight of components A), B) and C) total 100%, based on the total weight of components A), B) and C); ii) the %'s by weight of components D) and E) are based on the total weight of components A), B) and C); iii) the %'s by weight of components B) and C) are present in a total amount of at least 5% by weight; and iv) components D) and E) are present in a total amount of at least about 10% by weight.

8. The process of claim 7 wherein said curing step comprises exposing the coating composition to UV radiation.

9. The process of claim 8 wherein said radiation has a wavelength of at least 320 nm.

10. The process of claim 8 wherein said radiation has a wavelength of about 320 to 450 nm.

* * * * *